(12) United States Patent
Lee et al.

(10) Patent No.: US 10,623,630 B2
(45) Date of Patent: Apr. 14, 2020

(54) METHOD OF APPLYING A SPECIFIED EFFECT TO AN AREA OF AN IMAGE AND ELECTRONIC DEVICE SUPPORTING THE SAME

(71) Applicant: Samsung Electronics Co., Ltd., Gyeonggi-do (KR)

(72) Inventors: Hwa Jun Lee, Gyeonggi-do (KR); Dong Hoon Kim, Seoul (KR); Ji U Seo, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/666,197

(22) Filed: Aug. 1, 2017

(65) Prior Publication Data
US 2018/0035044 A1    Feb. 1, 2018

(30) Foreign Application Priority Data

Aug. 1, 2016  (KR) .................. 10-2016-0097834

(51) Int. Cl.
| | | |
|---|---|---|
| *H04N 5/232* | (2006.01) | |
| *G06K 9/00* | (2006.01) | |
| *H04N 5/235* | (2006.01) | |
| *H04N 5/262* | (2006.01) | |

(52) U.S. Cl.
CPC ..... *H04N 5/23219* (2013.01); *G06K 9/00228* (2013.01); *G06K 9/00248* (2013.01); *H04N 5/2351* (2013.01); *H04N 5/23216* (2013.01); *H04N 5/23293* (2013.01); *H04N 5/2621* (2013.01)

(58) Field of Classification Search
None
See application file for complete search history.

(56) References Cited

U.S. PATENT DOCUMENTS

| | | |
|---|---|---|
| 7,440,593 B1 | 10/2008 | Steinberg et al. |
| 7,630,527 B2 | 12/2009 | Steinberg et al. |
| 7,912,245 B2 | 3/2011 | Steinberg et al. |
| 7,961,230 B2 | 6/2011 | Hoshii |
| 7,986,811 B2 | 7/2011 | Steinberg et al. |

(Continued)

FOREIGN PATENT DOCUMENTS

| | | |
|---|---|---|
| CN | 102255949 | 11/2011 |
| JP | 2004-180173 | 6/2004 |

(Continued)

OTHER PUBLICATIONS

European Search Report dated Dec. 8, 2017 issued in counterpart application No. 17184189.3-1902, 7 pages.

(Continued)

*Primary Examiner* — Cynthia Segura
(74) *Attorney, Agent, or Firm* — The Farrell Law Firm, P.C.

(57) ABSTRACT

Methods and apparatuses for processing an image in an electronic device is provided. An image is obtained, and it is determined whether a specified shape exists in the image. When the specified shape exists in the image, a size of an area occupied by the specified shape in the image is calculated. It is determined whether the size of the area is greater than or equal to a first size. A specified effect is applied to the area, when the size of the area is greater than or equal to the first size.

16 Claims, 13 Drawing Sheets

(56) References Cited

U.S. PATENT DOCUMENTS

| | | | |
|---|---|---|---|
| 8,218,899 B2 | 7/2012 | Yamazaki et al. | |
| 8,391,645 B2 | 3/2013 | Steinberg et al. | |
| 8,472,751 B2 | 6/2013 | Yamazaki et al. | |
| 8,498,446 B2 | 7/2013 | Steinberg et al. | |
| 8,570,391 B2 | 10/2013 | Shimamura et al. | |
| 8,761,449 B2 | 6/2014 | Steinberg et al. | |
| 8,989,443 B2 | 3/2015 | Steinberg et al. | |
| 9,008,374 B2 | 4/2015 | Steinberg et al. | |
| 9,025,050 B2 | 5/2015 | Lee | |
| 9,497,393 B2* | 11/2016 | Reed | H05B 37/0227 |
| 10,218,918 B2 | 2/2019 | Ebihara et al. | |
| 2006/0055784 A1* | 3/2006 | Sugihara | H04N 9/735 348/207.99 |
| 2006/0125849 A1* | 6/2006 | Kubota | G09G 3/22 345/690 |
| 2007/0110305 A1* | 5/2007 | Corcoran | G06K 9/00228 382/167 |
| 2007/0115371 A1 | 5/2007 | Enomoto et al. | |
| 2008/0013799 A1 | 1/2008 | Steinberg et al. | |
| 2008/0013800 A1 | 1/2008 | Steinberg et al. | |
| 2008/0303918 A1* | 12/2008 | Keithley | G09G 3/20 348/223.1 |
| 2009/0059029 A1 | 3/2009 | Hoshii | |
| 2009/0060394 A1 | 3/2009 | Yamazaki et al. | |
| 2010/0157084 A1 | 6/2010 | Shimamura et al. | |
| 2010/0220899 A1 | 9/2010 | Steinberg et al. | |
| 2010/0278395 A1* | 11/2010 | Yen | G06K 9/00248 382/118 |
| 2010/0315485 A1* | 12/2010 | Song | H04N 7/147 348/14.12 |
| 2011/0043674 A1* | 2/2011 | Takane | H04N 5/2351 348/296 |
| 2011/0142338 A1* | 6/2011 | Do | G06K 9/00362 382/165 |
| 2011/0267489 A1* | 11/2011 | Sagawa | G06K 9/3233 348/222.1 |
| 2011/0285862 A1 | 11/2011 | Kim et al. | |
| 2012/0075504 A1 | 3/2012 | Steinberg et al. | |
| 2012/0147252 A1* | 6/2012 | Kunishige | H04N 5/23212 348/345 |
| 2012/0155709 A1 | 6/2012 | Steinberg et al. | |
| 2012/0162478 A1 | 6/2012 | Lee | |
| 2013/0039581 A1 | 2/2013 | Yamazaki et al. | |
| 2013/0169821 A1 | 7/2013 | Steinberg et al. | |
| 2013/0229518 A1* | 9/2013 | Reed | H05B 37/0227 348/148 |
| 2013/0314525 A1 | 11/2013 | Steinberg et al. | |
| 2013/0315488 A1 | 11/2013 | Steinberg et al. | |
| 2014/0036109 A1 | 2/2014 | Steinberg et al. | |
| 2014/0063039 A1* | 3/2014 | Drzaic | G09G 5/02 345/589 |
| 2014/0348399 A1* | 11/2014 | Kuo | G06K 9/00288 382/118 |
| 2015/0304638 A1* | 10/2015 | Cho | G01S 17/89 348/46 |
| 2015/0339520 A1* | 11/2015 | Yu | G06K 9/00355 382/103 |
| 2015/0350523 A1* | 12/2015 | Kinoshita | H04N 5/23212 348/352 |
| 2017/0019613 A1* | 1/2017 | Ebihara | G06T 1/00 |
| 2017/0200283 A1* | 7/2017 | Yamaguchi | H04N 5/23245 |
| 2017/0272621 A1* | 9/2017 | Park | G06K 9/6201 |
| 2018/0032797 A1* | 2/2018 | Lee | G06K 9/00228 |
| 2018/0336670 A1* | 11/2018 | Onuki | G06T 5/009 |
| 2019/0158763 A1 | 5/2019 | Ebihara et al. | |

FOREIGN PATENT DOCUMENTS

| | | |
|---|---|---|
| JP | 2006-072506 | 3/2006 |
| JP | 2010147808 | 7/2010 |
| JP | 2010219740 | 9/2010 |
| KR | 1020110007836 | 1/2011 |
| KR | 1020150040132 | 4/2015 |
| KR | 1020150104737 | 9/2015 |
| WO | WO 2015/178085 | 11/2015 |

OTHER PUBLICATIONS

European Search Report dated May 18, 2018 issued in counterpart application No. 17184189.3-1208, 5 pages.

European Search Report dated Oct. 31, 2018 issued in counterpart application No. 17184189.3-1208, 6 pages.

Chinese Office Action dated Aug. 26, 2019 issued in counterpart application No. 201710649615.0, 20 pages.

* cited by examiner

990

← Camera settings

Rear camera

Picture size
4:3 12M

Video size
QHD 2560 x 1440

Tracking AF
Focus on and track a subject selected on the preview screen.

Maximum number of face for effect
4 face               — 991

Rear camera

Picture size
4:3 5.0M

Video size
QHD 2560 x 1440

Save pictures as previewed
Save all pictures you take as shown in thepreview, not as flipped images

FIG.9B

METHOD OF APPLYING A SPECIFIED EFFECT TO AN AREA OF AN IMAGE AND ELECTRONIC DEVICE SUPPORTING THE SAME

PRIORITY

This application claims priority under 35 U.S.C. § 119(a) to a Korean Patent Application No. 10-2016-0097834, filed in the Korean Intellectual Property Office on Aug. 1, 2016, the entire disclosure of which is hereby incorporated by reference.

BACKGROUND

1. Field of the Disclosure

Embodiments of the present disclosure relate to a method of processing an image and an electronic device supporting the same.

2. Description of the Related Art

Electronic devices that include cameras, such as, for example, digital cameras, digital camcorders, smart phones, and the like, have increased in popularity. An electronic device including a camera may provide a photographing function. For example, an electronic device may output a preview image obtained through a camera onto a display, and may obtain an image photographed through the camera while a shutter is operated.

The electronic device may apply a specified effect to the image obtained through the camera. For example, the electronic device may apply a beauty effect, such as an effect that removes the wrinkles or blemishes of a face or brightly corrects the tone of the skin, to an image such that a bright portrait photograph is obtained.

However, when an effect is applied to an image, the same effect may be applied to the entire area of the image. In addition, a set effect may be applied to the image even when a specified shape, such as a face shape, does not exist in an image, thereby wasting resources due to unnecessary processing.

SUMMARY

Aspects of the present disclosure have been made to address at least the above-described problems and/or disadvantages and to provide at least the advantages described below. Accordingly, an aspect of the present disclosure provides an image processing method capable of detecting a specified shape in an image and applying a specified effect to an area where the specified shape is located in the image, when the specified shape exists in the image, and an electronic device supporting the same.

In accordance with an aspect of the present disclosure, an electronic device is provided that includes a camera configured to obtain an image of a target subject, a display configured to output the image, and a memory configured to store the image. The electronic device also includes a processor operatively connected to the camera, the display, and the memory, and configured to obtain the image through the camera, and determine whether a specified shape exists in the image. When the specified shape exists in the image, the processor is configured to calculate a size of an area occupied by the specified shape in the image. The processor is further configured to determine whether the size of the area is greater than or equal to a first size, and apply a specified effect to the area, when the size of the area is greater than or equal to the first size.

In accordance with another aspect of the present disclosure, a method of processing an image for an electronic device is provided. An image is obtained, and it is determined whether a specified shape exists in the image. When the specified shape exists in the image, a size of an area occupied by the specified shape in the image is calculated. It is determined whether the size of the area is greater than or equal to a first size. A specified effect is applied to the area, when the size of the area is greater than or equal to the first size.

In accordance with another aspect of the present disclosure, a method of processing an image for an electronic device is provided. An image is obtained, and one or more specified shapes are detected in the image. A specified effect is applied to at least one of the one or more specified shapes based on at least one of a first comparison of respective areas of the one or more specified shapes to a threshold, a second comparison of the respective areas with each other, at least one selected shape from among the one or more specified shapes, and an ambient illuminance value of the electronic device.

BRIEF DESCRIPTION OF THE DRAWINGS

The above and other aspects, features, and advantages of the present disclosure will be more apparent from the following detailed description when taken in conjunction with the accompanying drawings, in which:

FIG. 9B is a diagram illustrating a method of setting the number of areas to which a specified effect is applied, according to another embodiment of the present disclosure;

DETAILED DESCRIPTION

Figure 1:
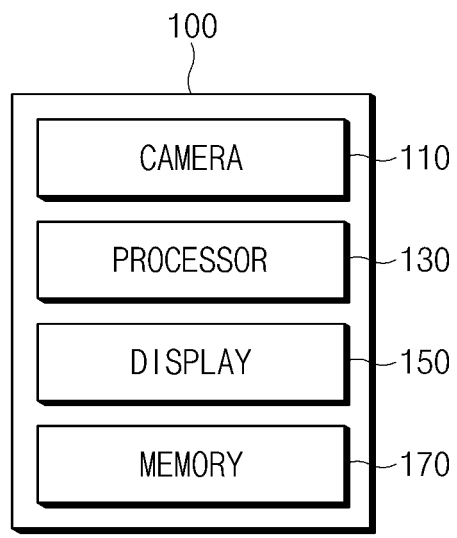
FIG. 1 is a block diagram illustrating an electronic device associated with image processing, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms and words used in the following description and claims are not limited to their bibliographical meanings, but, are merely used by the inventor to enable a clear and consistent understanding of the present disclosure. Accordingly, it should be apparent to those skilled in the art that the following description of various embodiments of the present disclosure is provided for illustrative purposes only and not for the purpose of limiting the present disclosure.

It is to be understood that the singular forms "a," "an," and "the" include plural referents unless the context clearly dictates otherwise. For example, reference to "a component surface" includes reference to one or more of such surfaces.

The terms "include," "comprise," "have", "may include," "may comprise," and "may have", as used herein, indicate disclosed functions, operations, or the existence of elements, but do not exclude other functions, operations or elements.

For example, the expressions "A or B" and "at least one of A and B" may indicate A and B, A, or B. For example, the expression "A or B" or "at least one of A and B" may indicate (1) at least one A, (2) at least one B, or (3) both at least one A and at least one B.

The terms such as "1st," "2nd," "first," "second," and the like, as used herein, may refer to modifying various different elements of various embodiments of the present disclosure, but are not intended to limit the elements. For example, "a first user device" and "a second user device" may indicate different users regardless of order or importance. A first component may be referred to as a second component, and vice versa, without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, when a component (for example, a first component) is referred to as being "directly connected to" or "directly accessed by" another component (for example, a second component), another component (for example, a third component) does not exist between the component (for example, the first component) and the other component (for example, the second component).

The expression "configured to", as used in various embodiments of the present disclosure, may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meanings of the related art, and, unless clearly defined herein, should not be understood differently or as having excessively formal meanings. Even terms defined herein are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HIVID)), a textile- or clothing-integrated-type device (e.g., an electronic apparel), a body-attached-type device (e.g., a skin pad or a tattoo), or a bio-implantable-type device (e.g., an implantable circuit)

In some embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box, a game console, an electronic dictionary, an electronic key, a camcorder, or an electronic picture frame In other embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device, according to some embodiments of the present disclosure, may be a flexible device. An electronic device, according to an embodiment of the present disclosure, is not limited to the above-described devices, and may include new electronic devices with the development of new technology.

Hereinafter, an electronic device, according to various embodiments of the present disclosure, will be described in more detail with reference to the accompanying drawings. The term "user", as used herein, may refer to a person who uses an electronic device or may refer to a device (e.g., an artificial intelligence electronic device) that uses an electronic device.

FIG. 1 is a block diagram illustrating an electronic device associated with image processing, according to an embodiment of the present disclosure.

Referring to FIG. 1, an electronic device 100 includes a camera 110, a processor 130, a display 150, and a memory 170. However, the configuration of the electronic device 100 is not limited thereto. According to various embodiments, the electronic device 100 may omit at least one of the elements described above, and may include at least one additional element.

The camera 110 may take a still image and a moving image. According to one embodiment, the camera 110 may include an imaging device. For example, the imaging device may include at least one of a lens that receives image light of a subject to convert the image light into an image, a diaphragm that controls the amount of light passing through the lens, a shutter that opens or closes the diaphragm to allow an image sensor to be exposed to the light passing through the lens for a predetermined time, the image sensor that receives an image formed on the lens as an optical signal, and an internal memory. The internal memory may temporarily store the photographed image. The internal memory may store an image photographed through the image sensor before the shutter is operated.

The processor 130 may include one or more of a CPU, an AP, and a communication processor (CP). For example, the processor 130 may execute operations or data processing related to control and/or communication of at least one other element of the electronic device 100. For example, the processor 130 may control a plurality of hardware or software elements connected thereto by driving an operating system or an application program and perform various kinds of data processing and calculations.

For example, the processor 130 may be implemented by a system on chip (SoC). According to an embodiment, the processor 130 may further include a graphical processing unit (GPU) and/or an image signal processor.

According to an embodiment, the processor 130 may be electrically connected to the lens, the diaphragm, the image sensor, the shutter, or the like, included in the camera 110 to control a function related to the camera 110. For example, the processor 130 may control functions such as autofocus, auto exposure, custom white balance, zoom in, zoom out, photographing, continuous photographing, timer photographing, flash on/off, filtering, and the like.

According to an embodiment, the processor 130 may store the photographed image in the internal memory or the memory 170. In addition, the processor 130 may output the photographed image to the display 150. For example, the processor 130 may provide an image stored in the internal memory in a preview or live view. The processor 130 may store the image photographed by operating the shutter in the internal memory and storing the photographed image in the memory 170 based on a specified user input or set information.

According to an embodiment, the processor 130 may detect the specified shape in the image. The processor 130 may determine whether there are feature points distributed in the pattern of the specified shape in the image. For example, the specified shape may include an omega shape corresponding to a shape of a human face. The feature point may include a point which represents a feature of the image to enable an object in the image to be detected, tracked, or recognized. For example, the feature point may include a point at which an object included in the image can be easily identified even in a case where the shape, size, or position of the object is changed in the image. In addition, the feature point may include a point at which the object can be easily identified in the image even in a case where the viewpoint of the camera 110 or illumination is changed.

According to an embodiment, the processor 130 may extract a corner point or a boundary point of an object included in the image from the image as the feature point. In this regard, the processor 130 may extract the feature point by using various feature point extraction schemes such as, for example, scale invariant feature transform (SIFT), speeded up robust features (SURF), local binary pattern (LBP), modified census transform (MCT), and the like. As another example, the processor 130 may extract a feature point based on information about the luminance of the image. For example, if the degree of change of the luminance value exceeds a specified magnitude, the processor 130 may extract the corresponding point as the feature point.

According to an embodiment, the processor 130 may divide an image into at least one sub-area and scan (e.g., zigzag scan) each of the sub-areas. The processor 130 may convert the sizes of feature points included in the sub-area while scanning the sub-area to determine whether a pattern corresponding to a specified shape (e.g., an omega shape) exists. In addition, the processor 130 may gradually increase the size of the sub-area to proceed with detection. The processor 130 may resize the minimum size of a pattern corresponding to the specified shape based on the size of the sub-area to compare the pattern with the pattern of the feature points. According to various embodiments, the processor 130 may scan all of the divided sub-areas, but may stop scanning if the specified shape is detected.

According to an embodiment, if the specified shape is detected in the image, the processor 130 may apply a specified effect to the area in which the specified shape is located in the image. For example, the processor 130 may change the size of at least a part of the area (e.g., a large eye effect), change the location of at least a part of the area (e.g., a shape correction effect), or change the color (RGB) value of the data corresponding to at least a part of the area (e.g., a wrinkle and blemish removal effect or a blur effect).

According to an embodiment, when the size of the specified shape is greater than or equal to a specified value, the processor 130 may apply the specified effect. For example, when the specified shape occupies 180 pixels or more on the display 150 in each of the horizontal or and vertical directions, the processor 130 may apply the specified effect. Alternatively, when the ratio of the area occupied by the specified shape on the display 150 is greater than or equal to a specified value, the processor 130 may apply the specified effect. However, the value of the size of the specified shape (e.g., 180×180 pixels or more) is not limited thereto.

According to an embodiment, when the size of the specified shape is changed to a specified value or less, the processor 130 may withdraw (or release) the application of the specified effect. For example, when the area occupied by the specified shape on the display 150 is changed to 154 pixels or less in each of the horizontal and vertical directions, the processor 130 may withdraw (or release) the application of the specified effect. Alternatively, when the ratio of the area occupied by the specified shape on the display 150 is less than or equal to the specified value, the processor 130 may withdraw (or release) the application of the specified effect. However, the value of the size of the specified shape (e.g., 154×154 pixels or less) is not limited thereto.

According to an embodiment, when the size of the specified shape is changed to a specified value or less and a specified time has elapsed, the processor 130 may withdraw (or release) the application of the specified effect. Accordingly, the processor 130 may prevent the specified effect from being easily withdrawn (or released) by not withdrawing (or releasing) the specified effect until the specified time has elapsed.

According to an embodiment, when the plurality of specified shapes exist in the image, the processor 130 may apply the specified effect to all the specified shapes, or apply the specified effect to only several of the specified shapes. For example, the processor 130 may apply the specified effect to several shapes selected from the specified shapes based on set information (e.g., the number of user-specified shapes). As another example, the processor 130 may apply the specified effect to only several shapes selected from the specified shapes in descending order of area size.

According to an embodiment, when there are a plurality of specified shapes in the image, the processor 130 may apply the specified effect to each of the specified shapes, to which the specified effect is applied, at the same degree or different degrees. For example, the processor 130 may apply the specified effect to the specified shape having the largest area size among the specified shapes at the greatest degree, and apply the specified effect while decreasing the degree in descending order of area size.

According to an embodiment, the processor 130 may apply the degree of the specified effect differently based on ambient illuminance. For example, the processor 130 may calculate the difference between an ambient illuminance value of the electronic device 100 and a reference illuminance value (e.g., 60,000 lux) and apply the degree of the specified effect differently based on the magnitude of the calculated value. For example, the processor 130 may relatively lower the applied degree of the specified effect as the difference between the ambient illuminance value of the electronic device 100 and the reference illuminance value increases. In this regard, the electronic device 100 may further include an illuminance sensor capable of measuring ambient illuminance.

The display 150 may include a liquid crystal display (LCD), a light-emitting diode (LED) display, an organic light emitting diode (OLED) display, a microelectromechanical systems (MEMS) display, or an electronic paper display. For example, the display 150 may display various contents (e.g., a text, image, a video, an icon, a symbol, etc.) for a user. According to an embodiment, the display 150 may output an image photographed through the camera 110. For example, the display 150 may output an image stored in an internal memory included in the camera 110, or an image stored in the memory 170 of the electronic device 100. According to an embodiment, the display 150 may include a touch screen and may receive a touch, gesture, proximity, or hovering input using an electronic pen or a body part of a user.

The memory 170 may include a volatile and/or nonvolatile memory. For example, the memory 170 may store instructions or data related to at least one other element of the electronic device 100. According to an embodiment, the memory 170 may store software and/or programs. For example, the memory 170 may store an application (e.g., a camera application) that supports photographing using the camera 110. As another example, the memory 170 may store an image photographed through the camera 110.

As described above, according to various embodiments, an electronic device (e.g., the electronic device 100) may include a camera (e.g., the camera 110) configured to obtain an image of a target subject, a display (e.g., the display 150) configured to output the image, a memory (e.g., the memory 170) configured to store the image, and a processor (e.g., the processor 130) operatively connected to the camera, the display, and the memory. The processor may be configured to obtain the image through the camera, determine whether a specified shape exists in the image, calculate a size of an area occupied by the specified shape in the image when the specified shape exists in the image, determine whether the size of the area is greater than or equal to a first size, and apply a specified effect to the area when the size of the area is greater than or equal to the first size.

The specified shape may include an omega shape.

The processor may be further configured to extract a plurality of feature points corresponding to at least one of a corner point and a boundary point of at least one object included in the image from the image, determine a pattern in which the feature points are distributed, and determine whether the pattern matches the specified shape.

The specified effect may include at least one of an effect of changing a size of at least a part of the area, an effect of changing a position of at least a part of the area, and an effect of changing a color value of data corresponding to at least a part of the area.

The processor may be further configured to release the specified effect when the size of the area is changed to be smaller than the first size.

The processor may be further configured to release the specified effect when the size of the area is changed to be smaller than the first size and a specified time elapses.

The processor may be further configured to differently apply at least one of a type and a degree of the specified effect to each of a plurality of areas occupied by a plurality of specified shapes in the image, when the plurality of specified shapes exist in the image.

The processor may be further configured to apply a first degree of the specified effect to a first area among the plurality of areas, and a second degree of the specified effect to a second area among the plurality of areas. A size of the first area may be greater than or equal to a second size, a size of the second area may be less than or equal to the second size, and the second degree of the specified effect may be less than the first degree of the specified effect.

The processor may be further configured to select a first area, which is a part of a plurality of areas occupied by a plurality of specified shapes in the image, and apply the specified effect to the first area, when the plurality of specified shapes exist in the image.

The processor may be further configured to provide a user interface configured to support setting a number of first areas.

The electronic device may further include an illuminance sensor configured to measure ambient illuminance of the electronic device. The processor may be further configured to obtain an ambient illuminance value of the electronic device through the illuminance sensor, calculate a difference value between the ambient illuminance value and a specified illuminance value, and differently apply a degree of the specified effect based on the difference value.

The processor may be further configured to apply a first degree of the specified effect when the difference value is less than or equal to a first magnitude, and apply a second degree of the specified effect, which is less than the first degree of the specified effect, when the difference value is equal to or greater than a second magnitude, which is greater than the first magnitude.

Figure 2:
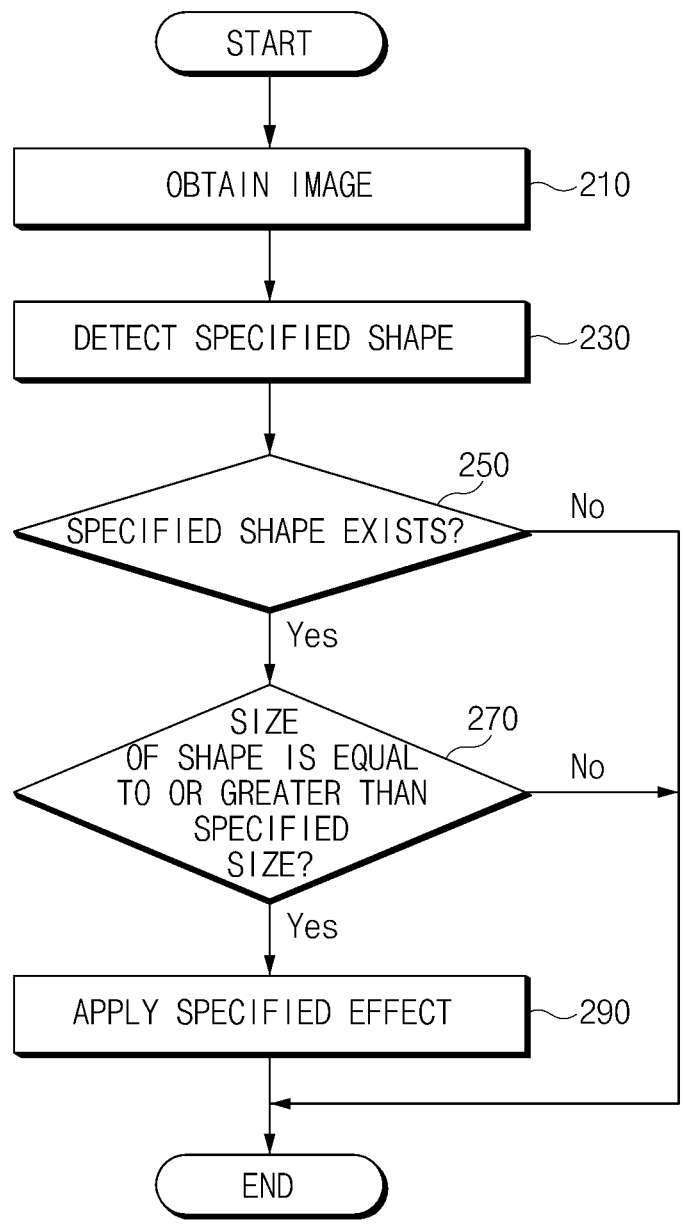
FIG. 2 is a flowchart illustrating a method of operating an electronic device related to image processing, according to an embodiment of the present disclosure.

FIG. 2 is a flowchart illustrating a method of operating an electronic device related to image processing, according to an embodiment of the present disclosure.

Referring to FIG. 2, in step 210, an electronic device (e.g., the electronic device 100) obtains an image. According to an embodiment, the electronic device may obtain an image photographed through a camera (e.g., the camera 110) included in the electronic device.

In step 230, the electronic device detects the specified shape in the image. According to an embodiment, the electronic device may detect an omega shape corresponding to a human face shape in the image. For example, the electronic device may extract feature points of the image to determine whether the extracted feature points are distributed in the pattern of the specified shape.

In step 250, the electronic device determines whether the specified shape exists in the image. For example, when the feature points included in the image are distributed in the pattern of the specified shape, the electronic device may determine that the specified shape exists in the image. In addition, the electronic device may determine the number of the specified shapes present in the image.

When the specified shape does not exist in the image, the methodology terminates. When the specified shape exists in the image, the electronic device determines whether the size of the specified shape is greater than or equal to a specified size, in step 270. For example, the electronic device may calculate the size of the area occupied by the specified shape on the display (e.g., the display 150) to determine whether the size of the area is greater than or equal to the specified size. As another example, the electronic device may calculate the ratio of the area occupied by the specified shape on the display to determine whether the ratio of the area is greater than or equal to the specified ratio.

When the size of the specified shape is less than the specified size, the methodology terminates. When the size of the specified shape is greater than or equal to than the specified size, the electronic device applies the specified effect to the area where the specified shape is located in the image, in step 290. For example, the specified effect may include a large eye effect, a shape correction effect, a wrinkle and blemish removal effect, a blur effect, or the like. To apply the specified effect, the electronic device may change the size of at least a part of the area, change the position of at least a part of the area, or change a color value of data corresponding to at least a part of the area.

According to an embodiment, when the plurality of specified shapes exist in the image, the electronic device may apply the specified effect to all the specified shapes, or apply the specified effect to only several of the specified shapes. For example, the electronic device may apply the specified effect to several shapes selected from the specified shapes based on set information (e.g., the number of user-specified shapes). As another example, the electronic device may apply the specified effect to only several shapes selected from the specified shapes in descending order of area size.

According to an embodiment, in a case where the plurality of specified shapes exist in the image, the electronic device may apply the specified effect to each of the specified shapes, to which the specified effect is applied, at the same degree or different degrees. For example, the electronic device may apply the specified effect to the specified shape having the largest area size among the specified shapes at the greatest degree, and apply the specified effect while decreasing the degree in descending order of area size.

According to an embodiment, the electronic device may apply the degree of the specified effect differently based on ambient illuminance. For example, the electronic device may calculate the difference between an ambient illuminance value of the electronic device and a reference illuminance value (e.g., 60,000 lux) and apply the degree of the specified effect differently based on the magnitude of the calculated value. For example, the electronic device may relatively lower the applied degree of the specified effect as the difference between the ambient illuminance value of the electronic device and the reference illuminance value increases.

Figure 3:
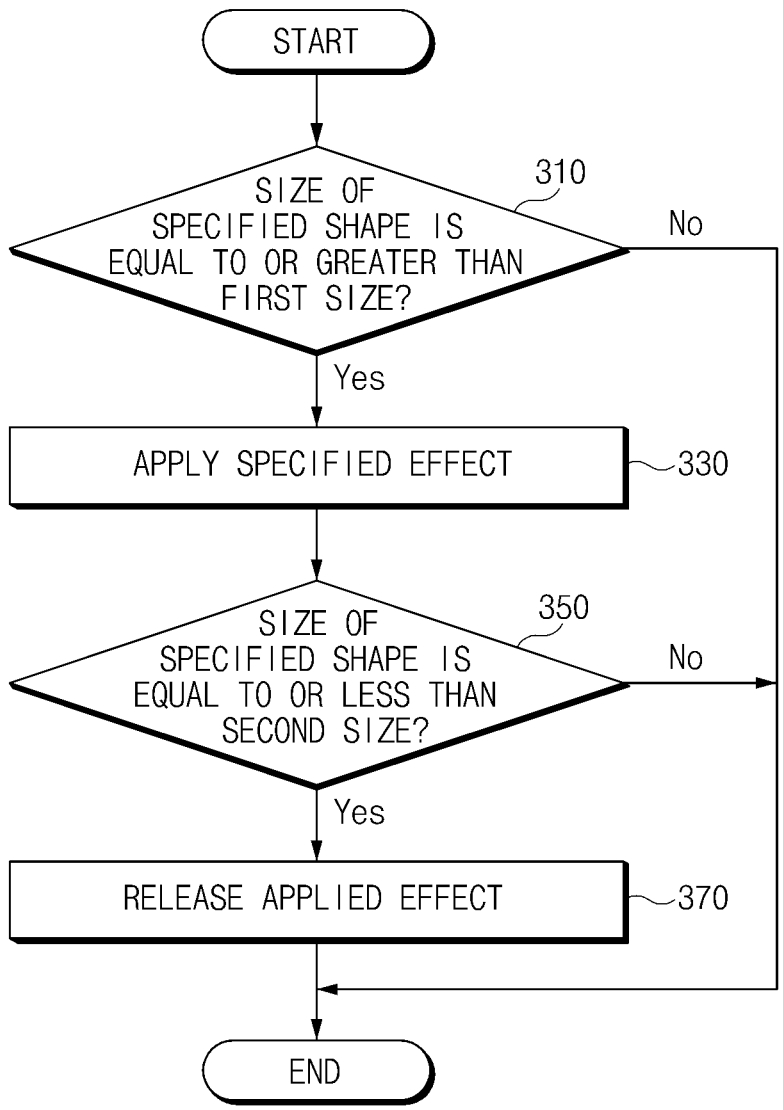
FIG. 3 is a flowchart illustrating a method of operating an electronic device relating to application and release of a specified effect, according to an embodiment of the present disclosure.

FIG. 3 is a flowchart illustrating a method of operating an electronic device relating to application and release of a specified effect, according to an embodiment of the present disclosure.

Referring to FIG. 3, in step 310, the electronic device (e.g., the electronic device 100) determines whether the size of the specified shape in the acquired image is greater than or equal to a first size. For example, the electronic device may determine whether the size of the area occupied by the specified shape on the display (e.g., the display 150) is greater than or equal to the first size. For example, the first size may include 180 pixels in each of the horizontal and vertical directions. However, the first size is not limited thereto.

When the size of the specified shape is less than the first size, the methodology terminates. When the size of the specified shape is greater than or equal to the first size, the electronic device applies the specified effect to the area where the specified shape is located, in step 330. For example, the electronic device may change the size of at least a part of the area, change the position of at least a part of the area, or change a color value of data corresponding to at least a part of the area.

The size of the specified shape may be changed. For example, when the zooming-in or zooming-out function of the camera (e.g., the camera 110) is performed during photographing, the size of the specified shape may be changed. Alternatively, when the electronic device is shaken, the size of the specified shape may be changed. If the size of the specified shape is changed, the electronic device may recalculate the size of the specified shape.

In step 350, it determined whether the size of the specified shape is less than or equal to a second size. For example, the second size may include 154 pixels in each of the vertical and horizontal directions. However, the second size is not limited thereto. According to an embodiment, the second size may be set to be smaller than or equal to the first size. In a case where the second size is set to be smaller than the first size, the specified effect may be prevented from being easily withdrawn (or released).

When the size of the specified shape is greater than the second size, the methodology terminates. When the size of the specified shape is less than or equal to the second size, the electronic device withdraws (or releases) the effect applied to the area in which the specified shape is located. For example, the electronic device may change the size of the area, the size of which is changed among the areas, to the original size, change the position of the area, the position of which is changed, among the areas to its original position, or change the color value of the data corresponding to the area, the color value of data of which is changed, among the areas to its original color value.

According to an embodiment, if the size of the specified shape is changed to the second size or less and a specified time has elapsed, the electronic device may withdraw (or release) the specified effect. Accordingly, the electronic device may prevent the specified effect from being easily withdrawn (or released) by not withdrawing (or releasing) the specified effect until the specific time has elapsed.

According to an embodiment, when the plurality of specified shapes exist in the image, the electronic device may withdraw (or release) the effect applied to each of the areas in which the plurality of specified shapes are located, or withdraw (or release) the effect applied to several of the areas in which the plurality of specified shapes are located. For example, the electronic device may withdraw (or release) the effect applied only to an area, the size of which is changed to the second size or less, among the areas where the plurality of signified shapes are located.

As described above, according to various embodiments, a method of processing an image for an electronic device, the method may include obtaining an image, determining whether a specified shape exists in the image, calculating a size of an area occupied by the specified shape in the image when the specified shape exists in the image, determining whether the size of the area is greater than or equal to a first size, and applying a specified effect to the area, when the size of the area is greater than or equal to the first size.

The method may further include releasing the specified effect when the size of the area is changed to be smaller than the first size.

The method may further include releasing the specified effect when the size of the area is changed to be smaller than the first size and a specified time elapses.

Applying the specified effect may include differently applying at least one of a type and a degree of the specified effect to each of a plurality of areas occupied by a plurality of specified shapes in the image, when the plurality of specified shapes exist in the image.

Applying the at least one of the type and the degree of the specified effect may include applying a first degree of the specified effect to a first area among the plurality of areas, and a second degree of the specified effect to a second area among the plurality of areas. A size of the first area may be greater than or equal to a second size, a size of the second area may be less than or equal to the second size, and the second degree of the specified effect may be less than the first degree of the specified effect.

Applying the specified effect may include selecting a first area which is a part of a plurality of areas occupied by a plurality of specified shapes in the image, and applying the specified effect to the first area, when the plurality of specified shapes exist in the image.

Applying the specified effect may include obtaining an ambient illuminance value of the electronic device through an illuminance sensor, calculating a difference value between the ambient illuminance value and a specified illuminance value, and differently applying a degree of the specified effect based on the difference value.

Applying the degree of the specified effect may include applying a first degree of the specified effect when the difference value is less than or equal to a first magnitude, and applying a second degree of the specified effect, which is less than the first degree of the specified effect, when the difference value is greater than or equal to a second magnitude, which is greater than the first magnitude.

Figure 4:
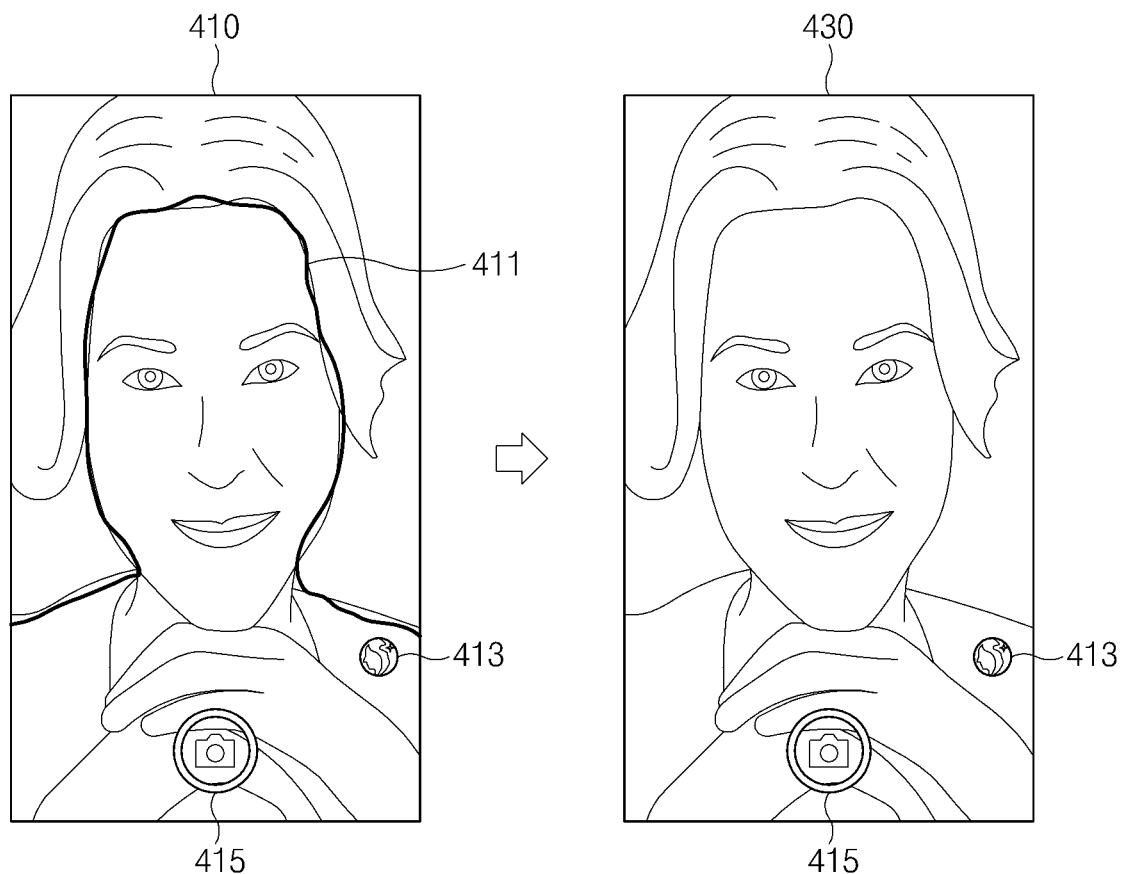
FIG. 4 is a diagram illustrating a screen related to image processing, according to an embodiment of the present disclosure.

FIG. 4 is a diagram illustrating a screen related to image processing, according to an embodiment of the present disclosure.

Referring to FIG. 4, the electronic device (e.g., the electronic device 100) may detect a specified shape 411 (e.g., an omega shape) in an acquired first image 410. For example, the electronic device may extract feature points from the first image 410 to determine whether the feature points are distributed in a pattern of the specified shape 411. In this regard, the electronic device may extract a corner point or a boundary point of an object included in the image 410 from the image 410 as the feature points. For example, the scheme of extracting a feature point may include SIFT, SURF, LBP, MCT, and the like. Alternatively, if the degree of change of the luminance value exceeds a specified magnitude based on the luminance value of each pixel the first image 410, the electronic device may extract the corresponding pixel as the feature point.

If the feature points are extracted, the electronic device may divide the first image 410 into at least one sub-area and scan each of the sub-areas. The electronic device may convert the sizes of feature points included in the sub-areas while scanning the sub-areas to determine whether the pattern corresponding to the specified shape 411 exists. In addition, the electronic device may gradually increase the size of the sub-area to proceed with detection. The electronic device may resize the minimum size of a pattern corresponding to the specified shape 411 based on the size of the sub-area to compare the pattern with the pattern of the feature points.

According to an embodiment, when the specified shape 411 exists in the first image 410, the electronic device may output a user interface (e.g., an effect setting button 413) supporting the setting of the type or degree of the specified effect to a display (e.g., the display 150). In addition, the electronic device may apply the specified effect to the first image 410 and output the second image 430, to which the specified effect is applied, to the display.

According to an embodiment, when the specified shape 411 exists in the first image 410, the electronic device may output a display object (e.g., a line object) corresponding to the size, type, and position of the specified shape 411 to the display. According to another embodiment, if a photographing button 415 is selected after the second image 430 is output, the electronic device may store the second image 430 in a memory (e.g., the memory 170).

Figure 5:
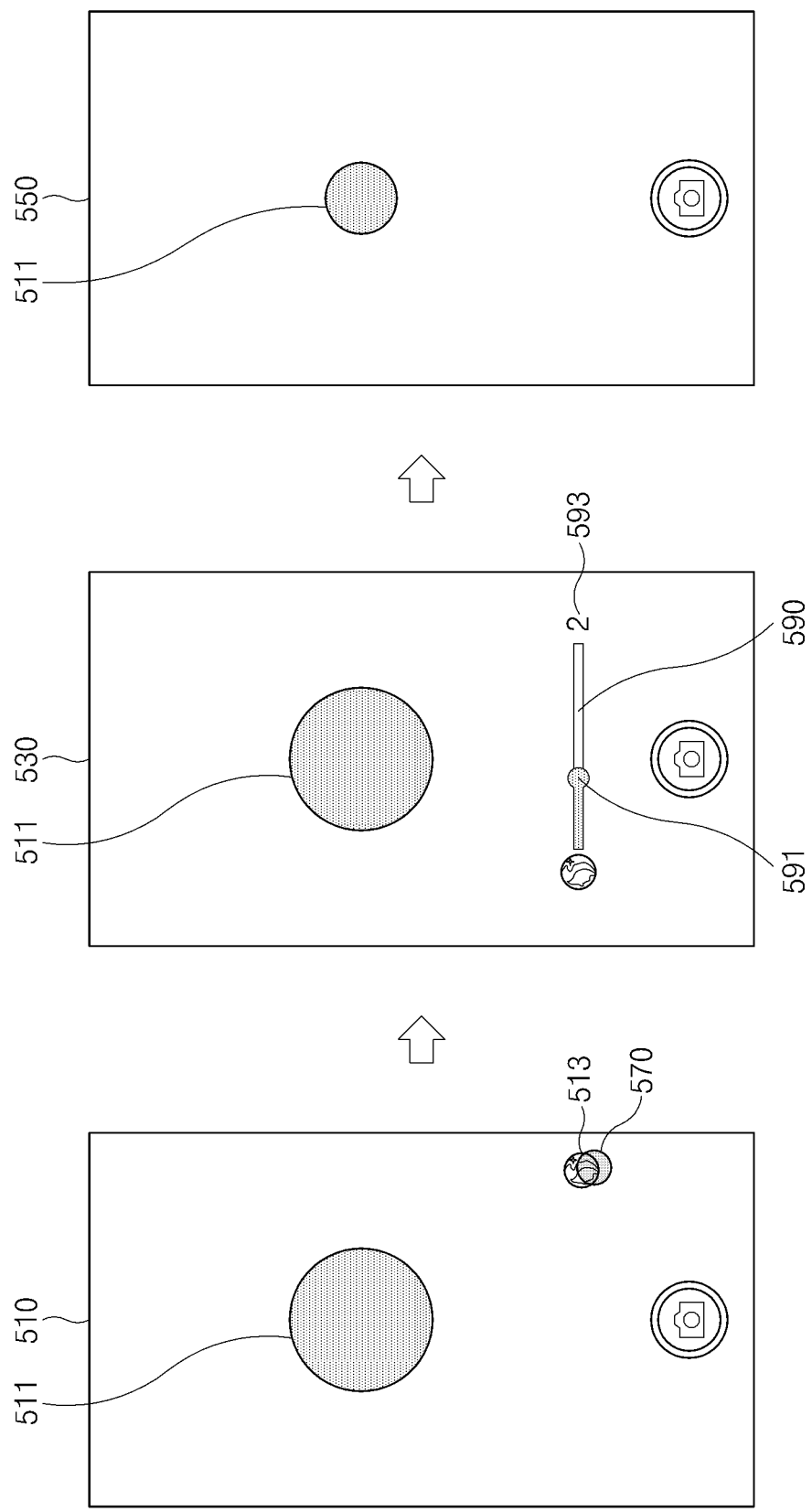
FIG. 5 is a diagram illustrating a method of setting an effect applied to an image, according to an embodiment of the present disclosure.

FIG. 5 is a diagram illustrating a method of setting an effect applied to an image, according to an embodiment of the present disclosure.

Referring to FIG. 5, when a specified shape 511 (e.g., an omega shape) exists in an acquired first image 510, the electronic device (e.g., the electronic device 100) may apply the specified effect to the area in which the specified shape 511 is located in the first image 510. In addition, the electronic device may output a second image 530 to which the specified effect is applied to a display (e.g., the display 150). In another embodiment, the electronic device may apply the specified effect only in a case where the size of the area occupied by the specified shape 511 on the display is greater than or equal to the first size (e.g., 180×180 pixels).

According to an embodiment, when the specified shape 511 exists in the first image 510, the electronic device may output a user interface (e.g., an effect setting button 513) supporting the setting of the type or degree of the specified effect to a display (e.g., the display 150). In addition, the electronic device may output a first display object (e.g., a check box object, a radio button object, etc.) including the type of a specified effect to select the type or degree of the specified effect, or a second display object 590 (e.g., a slide bar object) including a range of the degree of the specified effect, to the display in correspondence with the input 570 for selecting the effect setting button 513.

According to an embodiment, the second display object 590, which supports to set the degree of the specified effect, may include a point 591 indicating a currently set degree and/or a text 593 indicating a currently set degree. In an embodiment, the second display object 590 may further include a text corresponding to the maximum settable degree.

According to an embodiment, when the size of the specified shape 511 existing in the first or second image 510 or 530 is changed to be smaller than or equal to the second size (e.g., 154×154 pixels), as in a third image 550, the electronic device may terminate the output of the effect setting button 513 on the display. For example, the electronic device may hide the effect setting button 513, or may allow the effect setting button 513 to be transparent and invisible on the display. In an embodiment, the electronic device may maintain the output of the effect setting button 513 even in a case where the size of the specified shape 511 is changed to be equal to or smaller than the second size.

Figure 6:
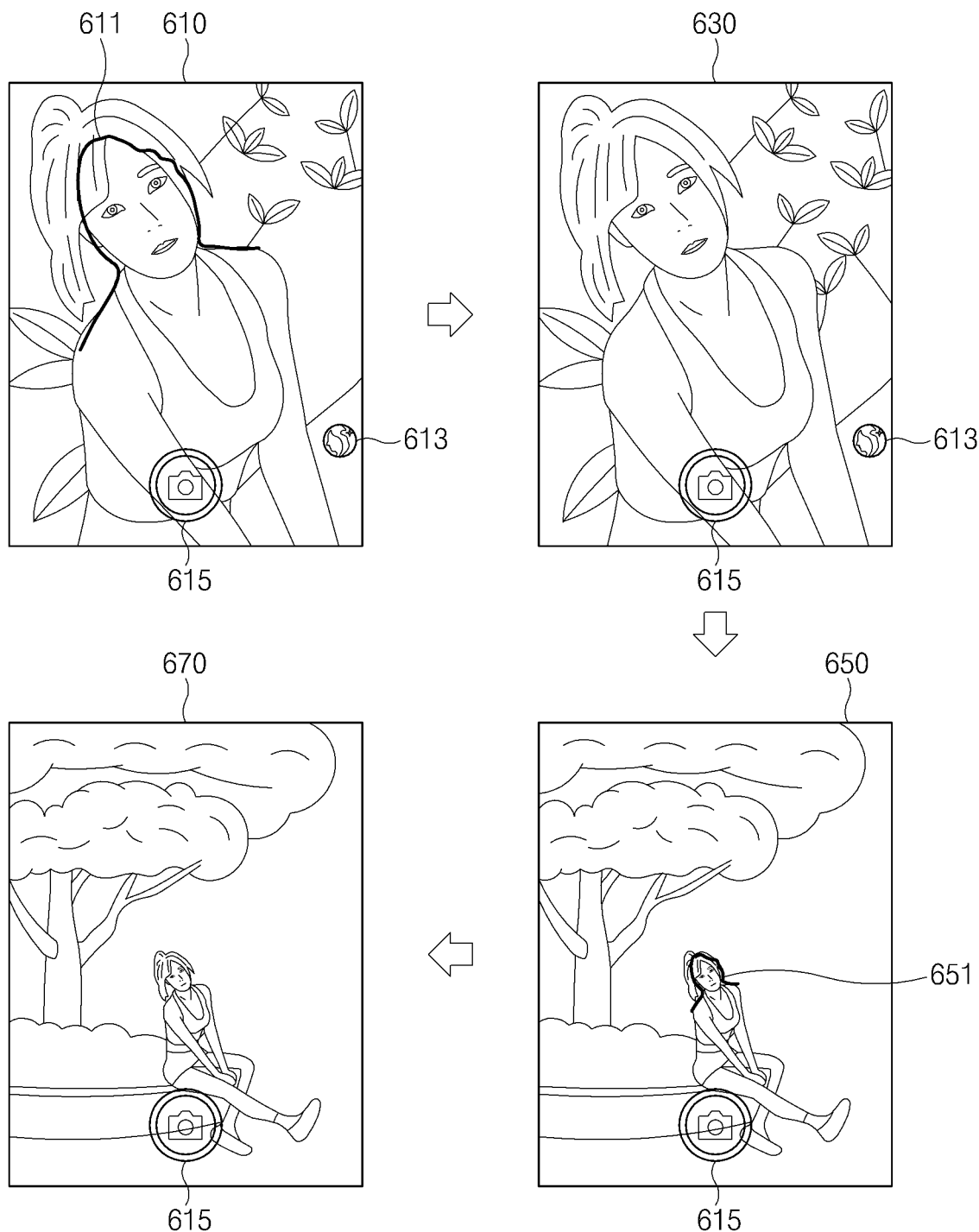
FIG. 6 is a diagram illustrating an application or release of an effect based on the size of a specified shape, according to an embodiment of the present disclosure.

FIG. 6 is a diagram illustrating an application or a release of an effect based on the size of a specified shape, according to an embodiment of the present disclosure.

Referring to FIG. 6, when a specified shape 611 (e.g., an omega shape) exists in an acquired first image 610, the electronic device (e.g., the electronic device 100) may apply the specified effect to the area in which the specified shape 611 is located in the first image 610. In addition, the electronic device may output a second image 630 to which the specified effect is applied to a display (e.g., the display 150).

According to an embodiment, the electronic device may apply the specified effect only when the size of the area occupied by the specified shape 611 on the display is greater than or equal to the first size (e.g., 180×180 pixels). In addition, when the specified shape 611 exists in the first image 610, the electronic device may output a user interface (e.g., an effect setting button 613) supporting the setting of the type or degree of the specified effect to the display.

According to an embodiment, the size of the specified shape 611 may be changed. For example, in a case where the electronic device is shaken or the zooming-in or zooming-out function of the camera (e.g., the camera 110) included in the electronic device is performed, the size of the specified shape 611 may be changed. A case where the electronic device performs the zooming-out function of the camera to obtain a third image 650 is shown.

According to an embodiment, when a new image is obtained, the electronic device may track the size, type, position, and the like of the specified shape 611. For example, the electronic device may re-detect a specified shape 651 in the third image 650 if the third image 650 is acquired.

According to an embodiment, when the size of the area occupied by the specified shape 651 in the third image 650 is less than or equal to the second size (e.g., 154×154 pixels), the electronic device may withdraw (or release) the applied effect. In addition, when the size of the area occupied by the specified shape 651 in the third image 650 is less than or equal to the second size, the electronic device may terminate the output of the effect setting button 613. For example, the electronic device may hide the effect setting button 613, or may allow the effect setting button 613 to be transparent and invisible.

According to an embodiment, the second size may be set to be less than or equal to the first size. When the second size is set to be less than the first size, the specified effect may be prevented from being easily withdrawn (or released).

According to an embodiment, the electronic device may store the image photographed in correspondence with the input for selecting a photographing button 615 in a memory (e.g., the memory 170). For example, if an input for selecting the photographing button 615 is generated in a state in which the second image 630 to which the specified effect is applied is output, the electronic device may store the second image 630 in the memory. As another example, if an input for selecting the photographing button 615 is generated in a state in which a fourth image 670 in which the specified effect is withdrawn (or released) is output, the electronic device may store the fourth image 670 in the memory.

Figure 7:
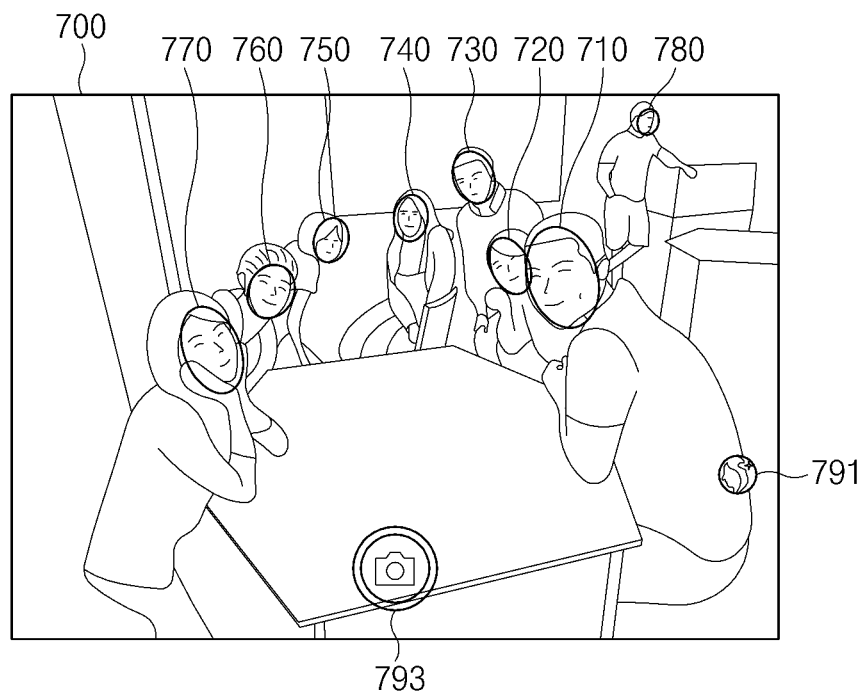
FIG. 7 is a diagram illustrating an effect applied to each area, according to an embodiment of the present disclosure.

FIG. 7 is a diagram illustrating an effect applied to each area, according to an embodiment of the present disclosure.

Referring to FIG. 7, the electronic device (e.g., the electronic device 100) may detect a specified shape (e.g., an omega shape) in an acquired first image 700. In the drawing, a state in which first to eighth shapes 710 to 780 are detected by the electronic device corresponding to human faces in the image 700 is shown.

According to an embodiment, when a plurality of specified shapes exist in the image 700, the electronic device may apply the specified effect to all the areas occupied by the plurality of specified shapes on the display (e.g., the display 150), or only several of the areas. For example, the electronic device may apply the specified effect to several areas selected from the areas occupied by the plurality of specified shapes on the display based on set information (e.g., the number of the user-specified shapes (or areas)). As another example, the electronic device may apply the specified effect to only several areas selected from the areas in descending order of area size. For example, as shown, when the number of shapes set by the user is two, the electronic device may apply the specified effect only to the areas corresponding to the first and seventh shapes 710 and 770 in descending order of size of the areas occupied by the specified shapes on the display.

According to an embodiment, if the specified shape exists in the image 700, the electronic device may output a user interface (e.g., an effect setting button 791) supporting the setting of the type or degree of the specified effect to the display. In addition, the electronic device may output a first display object (e.g., a check box object, a radio button object, etc.) including the type of the specified effect to select the type or degree of the specified effect, or a second display object (e.g., a slide bar object) including a range of the degree of the specified effect to the display in correspondence with the input for selecting the effect setting button 791.

According to an embodiment, when a plurality of specified shapes exist in the image 700, the electronic device may differently set the types or degrees of effects respectively applied to the areas occupied by the plurality of specified shapes on the display. For example, the electronic device may output the effect setting buttons 791 one by one to be adjacent to each of the areas. Alternatively, if any one of the areas is selected, the electronic device may output the effect setting button 791 adjacent to the selected area. In this case, if an input for selecting the effect setting button 791 is generated, the electronic device may support to set the kind or degree of the effect to be applied only to the selected area. In an embodiment, instead of outputting the effect setting button 791 adjacent to the selected area, the electronic device may output an image or text indicating the selected area to an area adjacent to the effect setting button 791. As another example, the electronic device may output the effect setting button 791 for setting the kind or degree of the effect applied to each area together with the effect setting button 791 for setting the kind or degree of the effect equally applied to all the areas.

According to an embodiment, the electronic device may store an image to which the specified effect is applied in a memory (e.g., the memory 170) corresponding to the input for selecting a photographing button 793.

Figure 8:
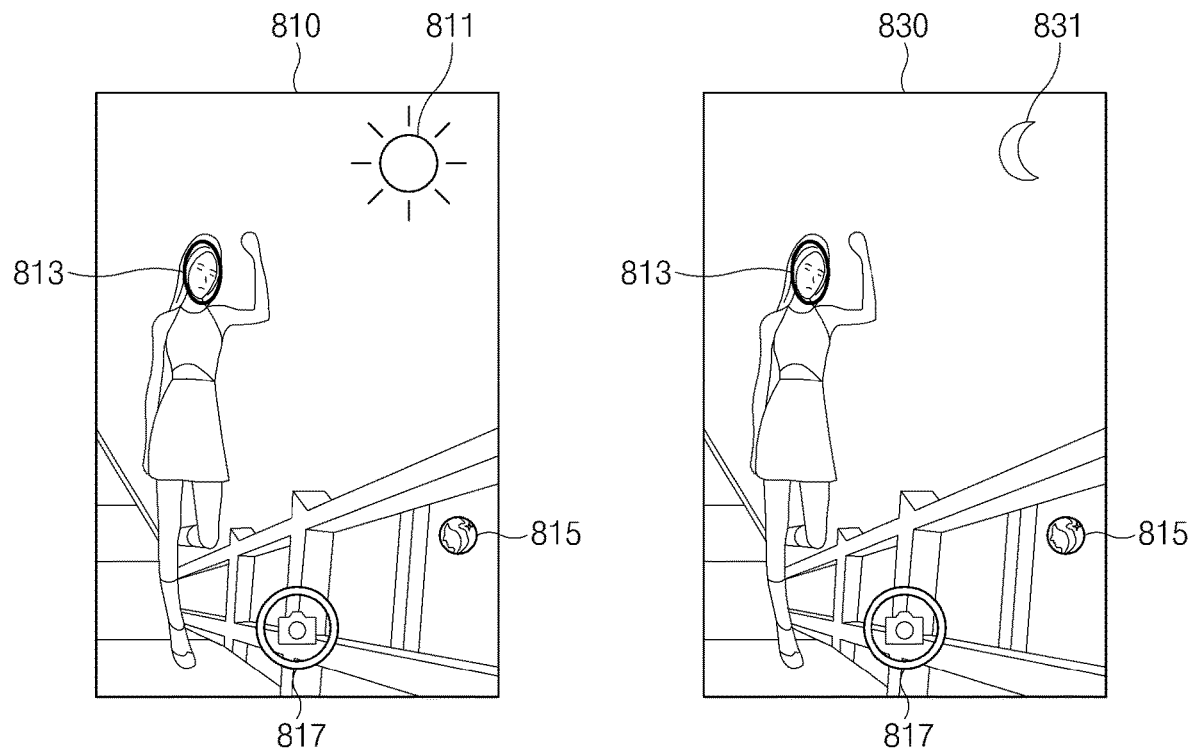
FIG. 8 is a diagram illustrating a degree of an effect applied based on ambient illuminance, according to an embodiment of the present disclosure.

FIG. 8 is a diagram illustrating a degree of an effect applied based on ambient illuminance, according to an embodiment of the present disclosure.

Referring to FIG. 8, the electronic device may apply the degree of the specified effect differently based on ambient illuminance. For example, the electronic device may calculate the difference between an ambient illuminance value of the electronic device and a reference illuminance value (e.g., 60,000 lux) and apply the degree of the specified effect differently based on the magnitude of the calculated value. For example, the electronic device may relatively lower the applied degree of the specified effect as the difference between the ambient illuminance value of the electronic device and the reference illuminance value increases.

As shown in FIG. 8, the electronic device may differently set the degree of the effect applied to a first image 810 and the degree of the effect applied to a second image 830, where the first image 810 is photographed during the day when a sun 811 is pictured and the second image 830 is photographed during the night when a moon 831 is pictured. For example, the electronic device may calculate the difference between the ambient illuminance value measured at the time of photographing the first image 810 and the reference illuminance value, and set the degree of the specified effect based on the magnitude of the calculated difference value as a first degree. In addition, the electronic device may calculate the difference between the ambient illuminance value measured at the time of photographing the second image 830 and the reference illuminance value, and set the degree of the specified effect based on the magnitude of the calculated difference value as a second degree. According to an embodiment, the first and second degrees may be set to be weaker as the calculated difference value is greater, and may be set to be higher as the calculated difference value is smaller. Thus, it is possible to prevent image deterioration, crushing phenomenon, or the like, which may occur when the degree of the specified effect is increased and applied to the image obtained in a state where the ambient illuminance is high or low.

According to an embodiment, when the specified shape exists in the image (e.g., the first image 810 or the second image 830), the electronic device may output a user interface (e.g., an effect setting button 815) supporting to set the type or degree of the specified effect to a display (e.g., the display 150). In addition, the electronic device may store an image to which the specified effect is applied in a memory (e.g., the memory 170) corresponding to the input for selecting a photographing button 817.

Figure 9A:
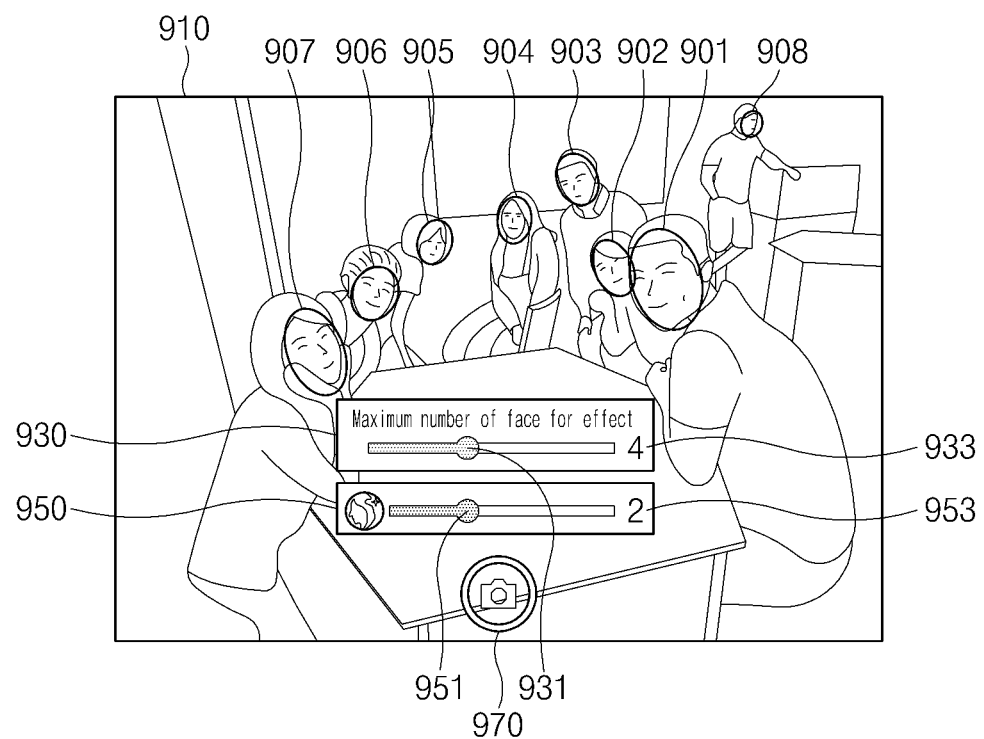
FIG. 9A is a diagram illustrating a method of setting the number of areas to which a specified effect is applied, according to an embodiment of the present disclosure.

FIG. 9A is a diagram illustrating a method of setting the number of areas to which a specified effect is applied, according to an embodiment of the present disclosure. FIG. 9B is a diagram illustrating a method of setting the number of areas to which a specified effect is applied, according to another embodiment of the present disclosure.

Referring to FIGS. 9A and 9B, the electronic device (e.g., the electronic device 100) may detect a specified shape (e.g., an omega shape) in an acquired image 910. A state in which first to eighth shapes 901 to 908 are detected by the electronic device corresponding to human faces in the image 910 is shown.

According to an embodiment, when the specified shape exists in the image 910, the electronic device may apply the specified effect to the area in which the specified shape is located in the image 910. When a plurality of specified shapes exist in the image 910, the electronic device may set the number of areas, to which the specified effect is to be applied, among the areas occupied by the plurality of specified shapes in the image 910.

For example, when the plurality of specified shapes are detected in the image 910, as shown in FIG. 9A, the electronic device may output a user interface (e.g., an application area number setting object 930) for setting the number of areas, to which the specified effect is applied, among the areas occupied by the plurality of specified shapes, to a display (e.g., the display 150).

According to an embodiment, the application area number setting object 930 may include a slide bar object. For example, the application area number setting object 930 may include a point 931 that indicates the number of currently set areas (or shapes) while being movable on the slide bar, and/or a text 933 that is adjacent to the slide bar and indicates the number of currently set areas (or shapes). The application area number setting object 930 may further include a text corresponding to the maximum number of settable areas (or shapes). The maximum number of the settable areas (or shapes) may correspond to the number of specified shapes detected in the image 910. For example, in FIG. 9A, the maximum number of the settable areas (or shapes) may be eight.

According to an embodiment, if the number of areas (or shapes) to which the specified effect is to be applied is determined by the user setting, the electronic device may apply the specified effect to only several of the areas occupied by the plurality of specified shapes in the image 910. For example, as shown in FIG. 9A, if the number of areas (or shapes) to which the specified effect is to be applied is determined to be four, the electronic device may apply the specified effect to only four areas among the areas occupied by the first to eighth shapes 901 to 908. In this case, the electronic device may select four areas from the areas in descending order of size and may apply the specified effect only to the selected four areas.

According to an embodiment, the electronic device may output an effect degree setting object 950 to set the degree of the specified effect to the display together with the application area number setting object 930. The effect degree setting object 950 may include a slide bar object. For example, the effect degree setting object 950 may include a point 951, which indicates a currently set degree while being movable on the slide bar, and/or a text 953 that is adjacent to the slide bar and indicates the currently set degree. The effect degree setting object 950 may further include a text corresponding to the maximum value of a settable degree.

As another example, as shown in FIG. 9B, the electronic device may allow a display object (e.g., an application area number setting button 991), for setting the number of areas (or shapes) to which the specified effect is to be applied, to be included in a setting menu of a camera (e.g., the camera 110) as an item. For example, the electronic device may change the number of areas to which the specified effect is to be applied corresponding to the input for selecting the application area number setting button 991.

According to an embodiment, the electronic device may store the image to which the specified effect is applied in a memory (e.g., the memory 170) corresponding to an input selecting a photographing button 970.

Figure 10:
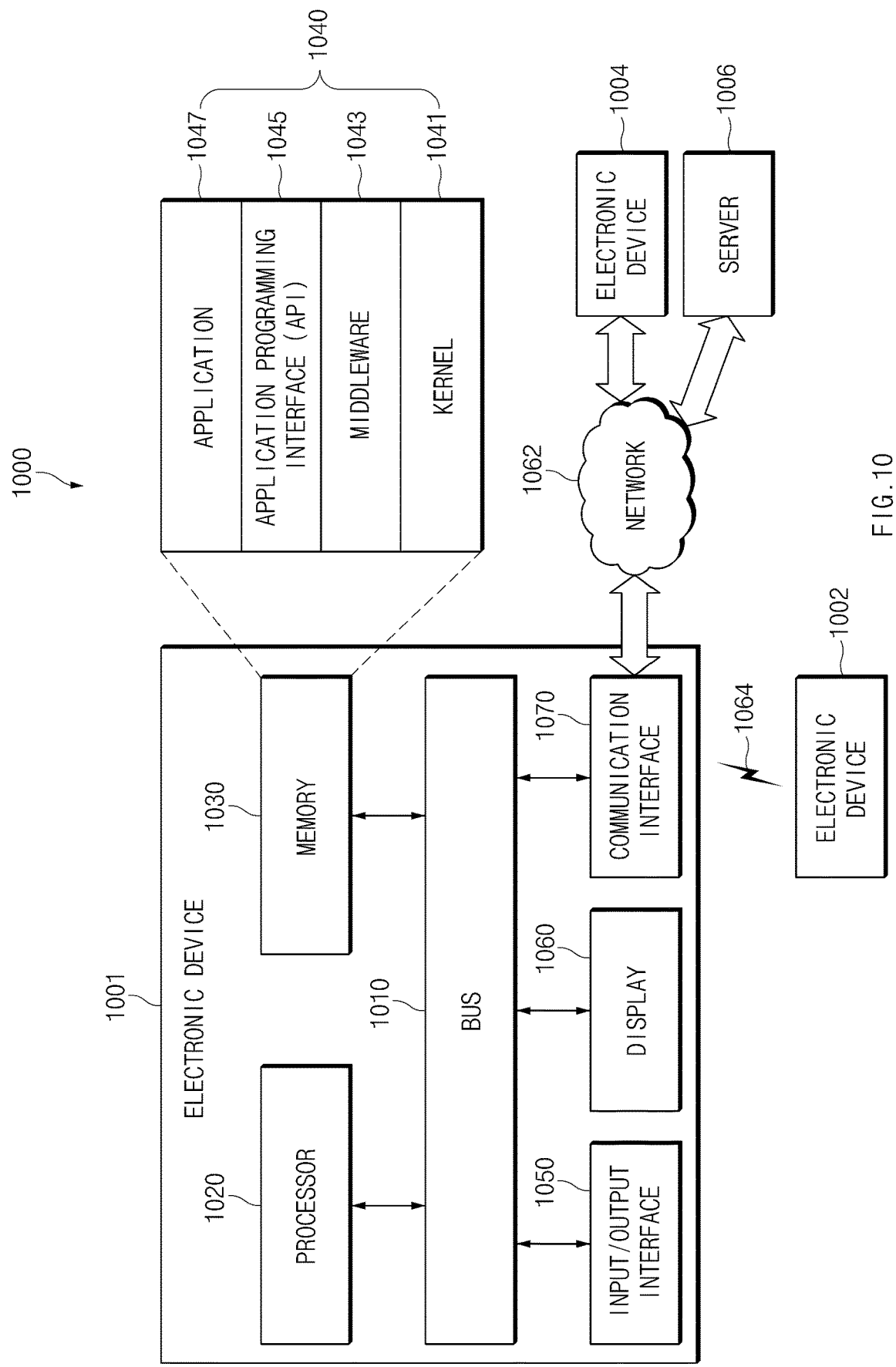
FIG. 10 is a diagram illustrating an electronic device in a network environment, according to an embodiment of the present disclosure.

FIG. 10 is a diagram illustrating an electronic device in a network environment, according to an embodiment of the present disclosure.

An electronic device 1001 in a network environment 1000, according to various embodiments of the present disclosure, is described with reference to FIG. 10. The electronic device 1001 includes a bus 1010, a processor 1020, a memory 1030, an input/output interface 1050, a display 1060, and a communication interface 1070. In various embodiments of the present disclosure, at least one of the foregoing elements may be omitted or another element may be added to the electronic device 1001.

The bus 1010 may include a circuit for connecting the above-mentioned elements 1010 to 1070 to each other and transferring communications (e.g., control messages and/or data) among the above-mentioned elements.

The processor 1020 may include at least one of a CPU, an AP, or a CP. The processor 1020 may perform data processing or an operation related to communication and/or control of at least one of the other elements of the electronic device 1001.

The memory 1030 may include a volatile memory and/or a nonvolatile memory. The memory 1030 may store instructions or data related to at least one of the other elements of the electronic device 1001. According to an embodiment of the present disclosure, the memory 1030 may store software and/or a program 1040. The program 1040 includes, for example, a kernel 1041, a middleware 1043, an application programming interface (API) 1045, and/or an application program (or an application) 1047. At least a portion of the kernel 1041, the middleware 1043, or the API 1045 may be referred to as an operating system (OS).

The kernel 1041 may control or manage system resources (e.g., the bus 1010, the processor 1020, the memory 1030, or the like) used to perform operations or functions of other programs (e.g., the middleware 1043, the API 1045, or the application 1047). Furthermore, the kernel 1041 may provide an interface for allowing the middleware 1043, the API 1045, or the application 1047 to access individual elements of the electronic device 1001 in order to control or manage the system resources.

The middleware 1043 may serve as an intermediary so that the API 1045 or the application 1047 communicates and exchanges data with the kernel 1041.

Furthermore, the middleware 1043 may handle one or more task requests received from the application 1047 according to a priority order. For example, the middleware 1043 may assign at least one application 1047 a priority for using the system resources (e.g., the bus 1010, the processor 1020, the memory 1030, or the like) of the electronic device 1001. For example, the middleware 1043 may handle the one or more task requests according to the priority assigned to the at least one application, thereby performing scheduling or load balancing with respect to the one or more task requests.

The API 1045, which is an interface for allowing the application 1047 to control a function provided by the kernel 1041 or the middleware 1043, may include, for example, at least one interface or function (e.g., instructions) for file control, window control, image processing, character control, or the like.

The input/output interface 1050 may serve to transfer an instruction or data input from a user or another external device to at least one other element of the electronic device 1001. Furthermore, the input/output interface 1050 may output instructions or data received from at least one other element of the electronic device 1001 to the user or another external device.

The display 1060 may include, for example an LCD, an LED display, an OLED display, a MEMS display, or an electronic paper display. The display 1060 may present various content (e.g., a text, an image, a video, an icon, a symbol, or the like) to the user. The display 1060 may include a touch screen, and may receive a touch, gesture, proximity or hovering input from an electronic pen or a part of a body of the user.

The communication interface 1070 may set communications between the electronic device 1001 and an external device (e.g., a first external electronic device 1002, a second external electronic device 1004, or a server 1006). For example, the communication interface 1070 may be connected to a network 1062 via wireless communications or wired communications so as to communicate with the external device (e.g., the second external electronic device 1004 or the server 1006).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1064. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1001 may transmit the electromagnetic signals to a reader device such as a POS device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1062 may include at least one of telecommunications networks, for example, a computer network (e.g., local area network (LAN) or wide area network (WAN)), the Internet, or a telephone network.

The types of the first external electronic device 1002 and the second external electronic device 1004 may be the same as or different from the type of the electronic device 1001. According to an embodiment of the present disclosure, the server 1006 may include a group of one or more servers. A portion or all of operations performed in the electronic device 1001 may be performed in one or more other electronic devices (e.g., the first external electronic device 1002, the second external electronic device 1004, or the server 1006). When the electronic device 1001 should perform a certain function or service automatically or in response to a request, the electronic device 1001 may request at least a portion of functions related to the function or service from another device (e.g., the first external electronic device 1002, the second external electronic device 1004, or the server 1006) instead of or in addition to performing the function or service for itself. The other electronic device (e.g., the first external electronic device 1002, the second external electronic device 1004, or the server 1006) may perform the requested function or additional function, and may transfer a result of the performance to the electronic device 1001. The electronic device 1001 may use a received result itself or additionally process the received result to provide the requested function or service. To this end, for example, a cloud computing technology, a distributed computing technology, or a client-server computing technology may be used.

Figure 11:
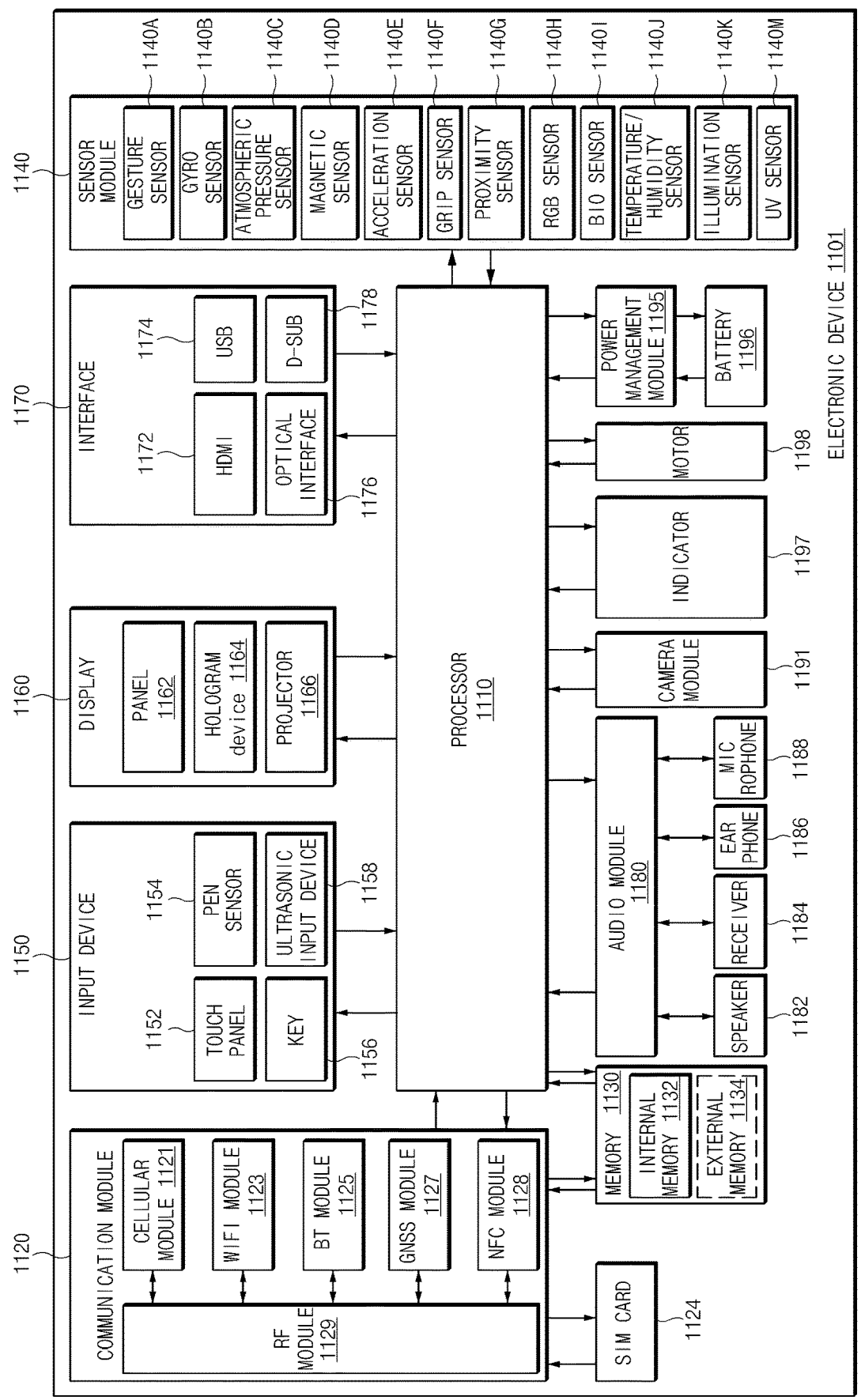
FIG. 11 is a block diagram illustrating an electronic device, according to an embodiment of the present disclosure.

FIG. 11 is a block diagram illustrating an electronic device, according to an embodiment of the present disclosure.

Referring to FIG. 11, an electronic device 1101 includes, for example, a part or the entirety of the electronic device 1001 illustrated in FIG. 10. The electronic device 1101 includes at least one processor (e.g., AP) 1110, a communication module 1120, a subscriber identification module (SIM) 1124, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may run an operating system or an application program so as to control a plurality of hardware or software elements connected to the processor 1110, and may process various data and perform operations. The processor 1110 may be implemented with, for example, a SoC. According to an embodiment of the present disclosure, the processor 1110 may further include a GPU and/or an image signal processor. The processor 1110 may include at least a portion (e.g., a cellular module 1121) of the elements illustrated in FIG. 11. The processor 1110 may load, on a volatile memory, an instruction or data received from at least one of other elements (e.g., a nonvolatile memory) to process the instruction or data, and may store various data in a nonvolatile memory.

The communication module 1120 may have a configuration that is the same as or similar to that of the communication interface 1070 of FIG. 10. The communication module 1120 includes, for example, a cellular module 1121, a Wi-Fi module 1123, a Bluetooth (BT) module 1125, a GNSS module 1127 (e.g., a GPS module, a GLONASS module, a BeiDou module, or a Galileo module), a NFC module 1128, and a radio frequency (RF) module 1129.

The cellular module 1121 may provide, for example, a voice call service, a video call service, a text message service, or an Internet service through a communication network. The cellular module 1121 may identify and authenticate the electronic device 1101 in the communication network using the subscriber identification module 1124 (e.g., a SIM card). The cellular module 1121 may perform at least a part of functions that may be provided by the processor 1110. The cellular module 1121 may include a CP.

Each of the Wi-Fi module 1123, the Bluetooth module 1125, the GNSS module 1127 and the NFC module 1128 may include, for example, a processor for processing data transmitted/received through the modules. According to some embodiments of the present disclosure, at least a part (e.g., two or more) of the cellular module 1121, the Wi-Fi module 1123, the Bluetooth module 1125, the GNSS module 1127, and the NFC module 1128 may be included in a single integrated circuit (IC) or IC package.

The RF module 1129 may transmit/receive, for example, communication signals (e.g., RF signals). The RF module 1129 may include, for example, a transceiver, a power amp module (PAM), a frequency filter, a low noise amplifier (LNA), an antenna, or the like. According to another embodiment of the present disclosure, at least one of the cellular module 1121, the Wi-Fi module 1123, the Bluetooth module 1125, the GNSS module 1127, or the NFC module 1128 may transmit/receive RF signals through a separate RF module.

The SIM card 1124 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1130 (e.g., the memory 1030) includes, for example, an internal memory 1132 and/or an external memory 1134. The internal memory 1132 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1134 may include a flash drive such as a compact flash (CF), a secure digital (SD), a Micro-SD, a Mini-SD, an extreme digital (xD), a MultiMediaCard (MMC), a memory stick, or the like. The external memory 1134 may be operatively and/or physically connected to the electronic device 1101 through various interfaces.

The sensor module 1140 may, for example, measure physical quantity or detect an operation state of the electronic device 1101 so as to convert measured or detected information into an electrical signal. The sensor module 1140 includes, for example, at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (e.g., a red/green/blue (RGB) sensor), a biometric sensor 1140I, a temperature/humidity sensor 1140J, an illumination sensor 1140K, or an ultraviolet (UV) sensor 1140M. Additionally or alternatively, the sensor module 1140 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1140 may further include a control circuit for controlling at least one sensor included therein. In some various embodiments of the present disclosure, the electronic device 1101 may further include a processor configured to control the sensor module 1140 as a part of the processor 1110 or separately, so that the sensor module 1140 is controlled while the processor 1110 is in a sleep state.

The input device 1150 includes, for example, at least one of a touch panel 1152, a (digital) pen sensor 1154, a key 1156, or an ultrasonic input device 1158. The touch panel 1152 may employ at least one of capacitive, resistive, infrared, and ultraviolet sensing methods. The touch panel 1152 may further include a control circuit. The touch panel 1152 may further include a tactile layer so as to provide a haptic feedback to a user.

The (digital) pen sensor 1154 may include, for example, a sheet for recognition which is a part of a touch panel or is separate. The key 1156 may include, for example, a physical button, an optical button, or a keypad. The ultrasonic input device 1158 may sense ultrasonic waves generated by an input tool through a microphone 1188 so as to identify data corresponding to the ultrasonic waves sensed.

The display 1160 (e.g., the display 1060 of FIG. 10) includes at least one of a panel 1162, a hologram device 1164, or a projector 1166. The panel 1162 may have a configuration that is the same as or similar to that of the display 1060 of FIG. 10. The panel 1162 may be, for example, flexible, transparent, or wearable. The panel 1162 and the touch panel 1152 may be integrated into a single module. The hologram device 1164 may display a stereoscopic image in a space using a light interference phenomenon. The projector 1166 may project light onto a screen so as to display an image. The screen may be disposed in the inside or the outside of the electronic device 1101. According to an embodiment of the present disclosure, the display 1160 may further include a control circuit for controlling the panel 1162, the hologram device 1164, or the projector 1166.

The interface 1170 includes, for example, at least one of an HDMI 1172, a USB 1174, an optical interface 1176, or a D-subminiature (D-sub) 1178. The interface 1170, for example, may be included in the communication interface 1070 illustrated in FIG. 10. Additionally or alternatively, the interface 1170 may include, for example, a mobile high-definition link (MHL) interface, an SD card/multi-media card (MMC) interface, or an infrared data association (IrDA) interface.

The audio module 1180 may convert, for example, a sound into an electrical signal or vice versa. At least a portion of elements of the audio module 1180 may be included in the input/output interface 1050 illustrated in FIG. 10. The audio module 1180 may process sound information input or output through a speaker 1182, a receiver 1184, an earphone 1186, or the microphone 1188.

The camera module 1191 is, for example, a device for shooting a still image or a video. According to an embodiment of the present disclosure, the camera module 1191 may include at least one image sensor (e.g., a front sensor or a rear sensor), a lens, an image signal processor (ISP), or a flash (e.g., an LED or a xenon lamp).

The power management module 1195 may manage power of the electronic device 1101. According to an embodiment of the present disclosure, the power management module 1195 may include a power management integrated circuit (PMIC), a charger integrated circuit (IC), or a battery gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1196 and a voltage, current or temperature thereof while the battery is charged. The battery 1196 may include, for example, a rechargeable battery and/or a solar battery.

The indicator 1197 may display a specific state of the electronic device 1101 or a part thereof (e.g., the processor 1110), such as a booting state, a message state, a charging state, or the like. The motor 1198 may convert an electrical signal into a mechanical vibration, and may generate a vibration or haptic effect. Although not illustrated, a processing device (e.g., a GPU) for supporting a mobile TV may be included in the electronic device 1101. The processing device for supporting a mobile TV may process media data according to the standards of digital multimedia broadcasting (DMB), digital video broadcasting (DVB), or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 12:
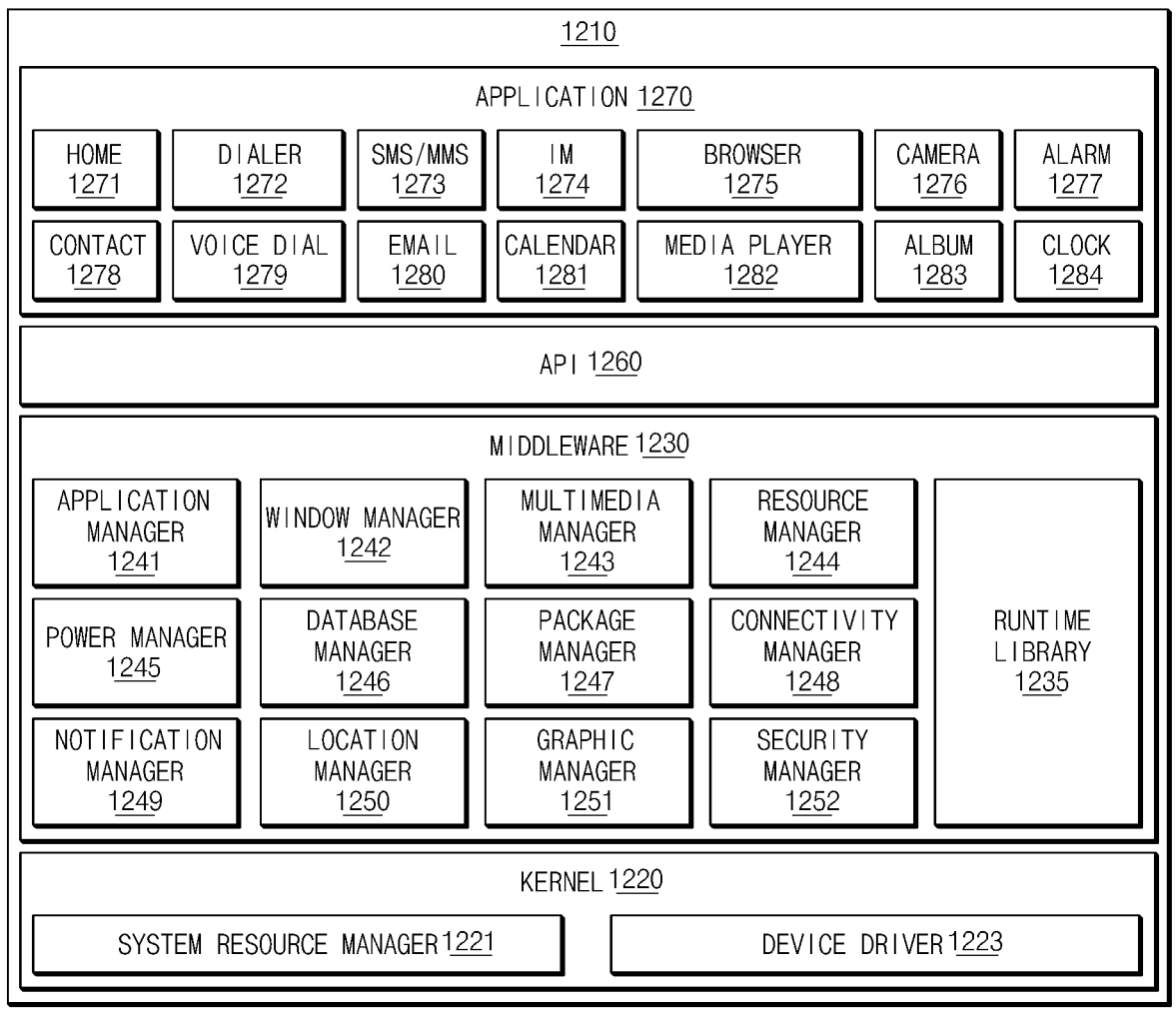
FIG. 12 is a block diagram illustrating a program module, according to an embodiment of the present disclosure.

FIG. 12 is a block diagram illustrating a program module, according to an embodiment of the present disclosure.

Referring to FIG. 12, a program module 1210 (e.g., the program 1040 of FIG. 10) may include an operating system (OS) for controlling a resource related to an electronic device (e.g., the electronic device 1001 of FIG. 10) and/or various applications (e.g., the application program 1047 of FIG. 10) running on the OS.

The program module 1210 includes a kernel 1220, a middleware 1230, an API 1260, and an application 1270. At least a part of the program module 1210 may be preloaded on an electronic device or may be downloaded from an external electronic device (e.g., the first electronic device 1002, the second external electronic device 1004, or the server 1006).

The kernel 1220 (e.g., the kernel 1041) includes, for example, a system resource manager 1221 or a device driver 1223. The system resource manager 1221 may perform control, allocation, or retrieval of a system resource. According to an embodiment of the present disclosure, the system resource manager 1221 may include a process management unit, a memory management unit, a file system management unit, or the like. The device driver 1223 may include, for example, a display driver, a camera driver, a Bluetooth driver, a shared memory driver, a USB driver, a keypad driver, a Wi-Fi driver, an audio driver, or an inter-process communication (IPC) driver.

The middleware 1230, for example, may provide a function that the applications 1270 require in common, or may provide various functions to the applications 1270 through the API 1260 so that the applications 1270 may efficiently use limited system resources in the electronic device. According to an embodiment of the present disclosure, the middleware 1230 (e.g., the middleware 1043) includes at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, and a security manager 1252.

The runtime library 1235 may include, for example, a library module that a complier uses to add a new function through a programming language while the application 1270 is running. The runtime library 1235 may perform a function for input/output management, memory management, or an arithmetic function.

The application manager 1241 may mange, for example, a life cycle of at least one of the applications 1270. The window manager 1242 may manage a GUI resource used in a screen. The multimedia manager 1243 may recognize a format required for playing various media files and may encode or decode a media file using a codec matched to the format. The resource manager 1244 may manage a resource such as a source code, a memory, or a storage space of at least one of the applications 1270.

The power manager 1245, for example, may operate together with a basic input/output system (BIOS) to manage a battery or power and may provide power information required for operating the electronic device. The database manager 1246 may generate, search, or modify a database to be used in at least one of the applications 1270. The package manager 1247 may manage installation or update of an application distributed in a package file format.

The connectivity manger 1248 may manage wireless connection of Wi-Fi, Bluetooth, or the like. The notification manager 1249 may display or notify an event such as message arrival, appointments, and proximity alerts in such a manner as not to disturb a user. The location manager 1250 may manage location information of the electronic device. The graphic manager 1251 may manage a graphic effect to be provided to a user or a user interface related thereto. The security manager 1252 may provide various security functions required for system security or user authentication. According to an embodiment of the present disclosure, in the case in which an electronic device (e.g., the electronic device 1001) includes a phone function, the middleware 1230 may further include a telephony manager for managing a voice or video call function of the electronic device.

The middleware 1230 may include a middleware module for forming a combination of various functions of the above-mentioned elements. The middleware 1230 may provide a module specialized for each type of an operating system to provide differentiated functions. Furthermore, the middleware 1230 may delete a part of existing elements or may add new elements dynamically.

The API 1260 (e.g., the API 1045 of FIG. 10) which is, for example, a set of API programming functions may be provided in different configurations according to an operating system. For example, one API set may be provided for each platform, or at least two API sets may be provided for each platform.

The application 1270 (e.g., the application program 1047 of FIG. 10), for example, includes at least one application capable of performing functions such as a home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, a clock 1284, health care (e.g., measure an exercise amount or blood sugar), or environmental information provision (e.g., provide air pressure, humidity, or temperature information).

According to an embodiment of the present disclosure, the application 1270 may include an information exchange application for supporting information exchange between the electronic device (e.g., the electronic device 1001 of FIG. 10) and an external electronic device (e.g., the first external electronic device 1002 or the second external electronic device 1004 of FIG. 10). The information exchange application may include, for example, a notification relay application for relaying specific information to the external electronic device or a device management application for managing the external electronic device.

For example, the notification relay application may have a function for relaying, to an external electronic device (e.g., the first external electronic device 1002 or the second external electronic device 1004 of FIG. 10), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1002 or the second external electronic device 1004) communicating with the electronic device, an application running in the external electronic device, or a service (e.g., a call service, a message service, or the like) provided from the external electronic device.

According to an embodiment of the present disclosure, the application 1270 may include a specified application (e.g., a healthcare application of a mobile medical device) according to an attribute of the external electronic device (e.g., the first external electronic device 1002 or the second external electronic device 1004 of FIG. 10). The application 1270 may include an application received from an external electronic device (e.g., the first external electronic device 1002 or the second external electronic device 1004 of FIG. 10). The application 1270 may include a preloaded application or a third-party application downloadable from a server. The names of the elements of the program module 1210 illustrated may vary with the type of an operating system.

According to various embodiments of the present disclosure, at least a part of the program module 1210 may be implemented with software, firmware, hardware, or a combination thereof. At least a part of the program module 1210, for example, may be implemented (e.g., executed) by a processor (e.g., the processor 1110). At least a part of the program module 1210 may include, for example, a module, a program, a routine, sets of instructions, or a process for performing at least one function.

According to the embodiments disclosed herein, the specified effect is applied only to the area where a specified shape is located in an image, so that unnecessary processing may be prevented, thereby effectively utilizing resources.

In addition, various effects may be directly or indirectly understood through this disclosure.

The term "module", as used herein, may represent, for example, a unit including one of hardware, software, and firmware or a combination thereof. The term "module" may be interchangeably used with the terms "unit", "logic", "logical block", "component" and "circuit". A module may be a minimum unit of an integrated component or may be a part thereof. A module may be a minimum unit for performing one or more functions or a part thereof. A module may be implemented mechanically or electronically. For example, a module may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations), according to various embodiments of the present disclosure, may be implemented as instructions stored in a computer-readable storage medium in the form of a program module. In the case where the instructions are performed by a processor (e.g., the processor 1020), the processor may perform functions corresponding to the instructions. The computer-readable storage medium may be, for example, the memory 1030.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module, according to various embodiments of the present disclosure, may include at least one of the above-described elements, or some elements may be omitted or additional elements may be added. Operations performed by the module, the program module or other elements, according to various embodiments of the present disclosure, may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and detail may be made therein without departing from the scope of the present disclosure as defined by the appended claims. Therefore, the scope of the present disclosure should not be defined as being limited to the embodiments, but should be defined by the appended claims and equivalents thereof.

What is claimed is:

1. An electronic device comprising:
   a camera configured to obtain an image of a target subject;
   a display configured to output the image;
   a memory configured to store the image; and
   a processor operatively connected to the camera, the display, and the memory, and configured to:
      obtain the image through the camera,
      determine whether a plurality of specified shapes exist in the image,
      when the plurality of specified shapes exist in the image, calculate a size of a first area occupied by a first specified shape and a size of a second area occupied by a second specified shape,
      determine whether the size of the first area is greater than or equal to the size of the second area,
      when the size of the first area is greater than or equal to the size of the second area, apply a greater degree of a specified effect to the first area than the second area, and
      when the size of the first area is not greater than or equal to the size of the second area, apply a greater degree of the specified effect to the second area than the first area.

2. The electronic device of claim 1, wherein, in determining whether the plurality of specified shapes exist in the image, the processor is further configured to:
   extract a plurality of feature points corresponding to at least one of a corner point and a boundary point of at least one object included in the image from the image,
   determine a pattern in which the feature points are distributed, and
   determine whether the pattern matches the first or the second specified shape.

3. The electronic device of claim 1, wherein the specified effect includes at least one of an effect of changing a size of at least a part of the first or the second area, an effect of changing a position of at least a part of the first or the second area, and an effect of changing a color value of data corresponding to at least a part of the first or the second area.

4. The electronic device of claim 1, wherein the processor is further configured to release the specified effect when the size of the first area is changed to be smaller than a first size.

5. The electronic device of claim 1, wherein the processor is further configured to release the specified effect when the size of the first area is changed to be smaller than a first size and a specified time elapses.

6. The electronic device of claim 1, wherein the processor is further configured to select the first area, and apply the specified effect to the first area, when the plurality of specified shapes exist in the image.

7. The electronic device of claim 6, wherein the processor is further configured to provide a user interface configured to support setting a number of first areas.

8. The electronic device of claim 1, further comprising:
   an illuminance sensor configured to measure ambient illuminance of the electronic device,
   wherein the processor is further configured to obtain an ambient illuminance value of the electronic device through the illuminance sensor, calculate a difference value between the ambient illuminance value and a specified illuminance value, and differently apply a degree of the specified effect based on the difference value.

9. The electronic device of claim 8, wherein the processor is further configured to apply a first degree of the specified effect when the difference value is less than or equal to a first magnitude, and apply a second degree of the specified effect, which is less than the first degree of the specified effect, when the difference value is greater than or equal to a second magnitude, which is greater than the first magnitude.

10. A method of processing an image for an electronic device, the method comprising:
    obtaining an image;
    determining whether a plurality of specified shapes exist in the image;
    when the plurality of specified shapes exist in the image, calculating a size of a first area occupied by a first specified shape and a size of a second area occupied by a second specified shape;
    determining whether the size of the first area is greater than or equal to the size of the second area;
    when the size of the first area is greater than or equal to the size of the second area, applying a greater degree of a specified effect to the first area than the second area; and when the size of the first area is not greater than or equal to the size of the second area, applying a greater degree of the specified effect to the second area than the first area.

11. The method of claim 10, further comprising:
releasing the specified effect when the size of the first area is changed to be smaller than a first size.

12. The method of claim 10, further comprising:
releasing the specified effect when the size of the first area is changed to be smaller than a first size and a specified time elapses.

13. The method of claim 10, wherein applying the specified effect comprises:
selecting the first area, and applying the specified effect to the first area, when the plurality of specified shapes exist in the image.

14. The method of claim 10, wherein applying the specified effect comprises:
obtaining an ambient illuminance value of the electronic device through an illuminance sensor;
calculating a difference value between the ambient illuminance value and a specified illuminance value; and
differently applying a degree of the specified effect based on the difference value.

15. The method of claim 14, wherein differently applying the degree of the specified effect comprises applying a first degree of the specified effect when the difference value is less than or equal to a first magnitude, and applying a second degree of the specified effect, which is less than the first degree of the specified effect, when the difference value is greater than or equal to a second magnitude, which is greater than the first magnitude.

16. A method of processing an image for an electronic device, the method comprising:
obtaining an image;
detecting one or more specified shapes in the image;
obtaining a difference value between an ambient illuminance value of the electronic device and a reference illuminance value; and
applying a specified effect to at least one of the one or more specified shapes based on a comparison of respective areas of the one or more specified shapes to a threshold,
wherein the specified effect is an effect of changing a size, a position, or a color value of a part of the one or more specified shapes,
wherein a degree of the specified effect applied to the one or more specified shapes is determined based on the difference value, and
wherein the applied degree of the specified effect decreases as the difference between the ambient illuminance value of the electronic device and the reference illuminance value increases.

* * * * *